(12) United States Patent
Eslami

(10) Patent No.: US 12,530,922 B2
(45) Date of Patent: Jan. 20, 2026

(54) KEYPOINTS-BASED ESTIMATION OF FACE BOUNDING BOX

(71) Applicants: SONY GROUP CORPORATION, Tokyo (JP); SONY CORPORATION OF AMERICA, New York, NY (US)

(72) Inventor: Ramin Eslami, Livermore, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 438 days.

(21) Appl. No.: 17/844,985

(22) Filed: Jun. 21, 2022

(65) Prior Publication Data

US 2023/0410556 A1    Dec. 21, 2023

(51) Int. Cl.
*G06V 40/16* (2022.01)
*G06T 7/60* (2017.01)
(Continued)

(52) U.S. Cl.
CPC .............. *G06V 40/171* (2022.01); *G06T 7/60* (2013.01); *G06T 7/73* (2017.01); *G06T 11/00* (2013.01);
(Continued)

(58) Field of Classification Search
CPC .. G06V 40/171; G06V 40/161; G06V 40/165; G06V 40/10; G06V 40/16;
(Continued)

(56) References Cited

U.S. PATENT DOCUMENTS 9,275,273 B2    3/2016  Belhumeur et al.
9,483,695 B2 *  11/2016  S ............................. G06F 3/013
(Continued)

FOREIGN PATENT DOCUMENTS

CA    3174258 A1 *  4/2022  ............. G06V 20/63
CN    110188630 A *  8/2019  ........... G06V 40/168
(Continued)

OTHER PUBLICATIONS

Reese, Richard M., Reese, Jennifer L., and Grigorev, Alexey. Java: Data Science Made Easy. 1st edition. Packt Publishing, Jul. 2017, Chapter 2 [online] [retrieved on Sep. 9, 2024]. (Year: 2017) Retrieved from the internet via O'Reilly Learning: <URL: https://learning.oreilly.com/library/view/java-data-science/9781788475655/>. (Year: 2017).*

(Continued)

*Primary Examiner* — Matthew C Bella
*Assistant Examiner* — Nicholas John Helco
(74) *Attorney, Agent, or Firm* — CHIP LAW GROUP

(57) ABSTRACT

An electronic device and method for keypoints-based estimation of face bounding box is provided. The electronic device receives an image that includes an object and detects a set of facial keypoints on a face of the object in the image. The set of facial keypoints corresponds to a set of facial features of the object. The electronic device identifies a face pose of the object in the image based on the detected set of facial keypoints and computes a set of values that is associated with a size and a position of a face bounding box in the image. The computation is based on the identified face pose and locations of the set of facial keypoints in the image. The electronic device overlays the face bounding box on the image based on the computed set of values.

20 Claims, 7 Drawing Sheets

(51) Int. Cl.
*G06T 7/73* (2017.01)
*G06T 11/00* (2006.01)

(52) U.S. Cl.
CPC .................... *G06T 2207/30201* (2013.01);
*G06T 2210/12* (2013.01)

(58) Field of Classification Search
CPC .. G06V 10/20; G06T 7/60; G06T 7/73; G06T 11/00; G06T 2207/30201; G06T 2210/12; G06T 7/70; G06T 2207/30242; G06T 2211/441
See application file for complete search history.

(56) References Cited

U.S. PATENT DOCUMENTS

| | | | |
|---|---|---|---|
| 10,395,373 B1* | 8/2019 | Brewster | G06T 7/90 |
| 12,361,752 B2* | 7/2025 | Eslami | G06T 7/60 |
| 2010/0321513 A1* | 12/2010 | Zhang | G06V 10/44 382/199 |
| 2012/0026308 A1* | 2/2012 | Johnson | G06T 7/73 348/E7.085 |
| 2012/0147167 A1* | 6/2012 | Manson | G06V 20/64 382/118 |
| 2015/0049910 A1* | 2/2015 | Ptucha | G06V 40/16 382/118 |
| 2017/0109569 A1* | 4/2017 | Kim | G06V 20/64 |
| 2017/0147866 A1* | 5/2017 | Tokui | G06V 40/165 |
| 2020/0218435 A1* | 7/2020 | Desmond | G06F 3/0482 |
| 2020/0371586 A1* | 11/2020 | Weng | G06T 7/73 |
| 2020/0402253 A1* | 12/2020 | Ivanov Bonev | G06V 40/165 |
| 2021/0397861 A1* | 12/2021 | Elrasad | G06V 20/52 |
| 2023/0177871 A1* | 6/2023 | Eslami | G06V 40/171 382/103 |

FOREIGN PATENT DOCUMENTS

| | | |
|---|---|---|
| CN | 107704817 B | 6/2021 |
| JP | 2021-105887 A | 7/2021 |
| JP | 6927540 B1 | 9/2021 |
| WO | WO-2015162605 A2 * | 10/2015 ........... H04N 23/611 |

OTHER PUBLICATIONS

Reese, Richard M., Reese, Jennifer L., and Grigorev, Alexey. Java: Data Science Made Easy.</i> 1st edition. Packt Publishing, Jul. 2017, Chapter 2 [online] [retrieved on Sep. 9, 2024]. (Year: 2017). Retrieved from the internet via O'Reilly Learning: <URL: https://learning.oreilly.com/library/view/java-data-science/9781788475655/>. (Year: 2017).*

Popovici et al, "On Performance Evaluation of Face Detection and Localization Algorithms", Aug. 26, 2004 [retrieved on Sep. 3, 2024], ICPR 2004 [online], vol. 1, pp. 313-317. Retrieved from IEEE Xplore: <URL: https://ieeexplore.ieee.org/document/1334115>. <DOI: 10.1109/ICPR.2004.1334115 >. (Year: 2004).*

Reese, Richard M., Reese, Jennifer L., and Grigorev, Alexey. Java: Data Science Made Easy.</i> 1st edition. Packt Publishing, Jul. 2017, Chapter 2 [online] [retrieved on Sep. 9, 2024]. (Year: 2017).*

* cited by examiner

KEYPOINTS-BASED ESTIMATION OF FACE BOUNDING BOX

CROSS-REFERENCE TO RELATED APPLICATIONS/INCORPORATION BY REFERENCE

None.

FIELD

Various embodiments of the disclosure relate to face detection. More specifically, various embodiments of the disclosure relate to an electronic device and method for face detection based on facial keypoints.

BACKGROUND

Advancements in the field of image processing have led to development of several techniques for face detection in digital images. Face detection is a technology that is used to find and identify faces in digital images and to generate a bounding box around the identified faces. Face detection may be used as a pre-processing step in a variety of downstream tasks, such as auto-focus, auto exposure, and auto white-balance. Most of the techniques for face detection that are known in the art rely on neural network models. Due to complexity of the neural networks and processing power requirements, the implementation of neural networks in a variety of devices (especially in low budget devices or size-constrained devices) can be a challenging task. Due to such challenges, many devices may lack the functionality of face detection and other operations that depend on face detection, as a pre-processing step, in order to achieve their intended objective. On such devices, it may be difficult to implement techniques that use neural networks as such techniques can severely constrain other parallel operations on the devices by taking over a significant portion of the memory and computational resources.

In some applications, face detection may be used for animal identification, which may be crucial for monitoring food quality, prevention of diseases, and the like. Since facial topologies and facial features of human and animal faces are different, face detection techniques that are known in the art for human face detection may not be suitable for the detection of an animal face with acceptable accuracy.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method of face detection based on facial keypoints is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
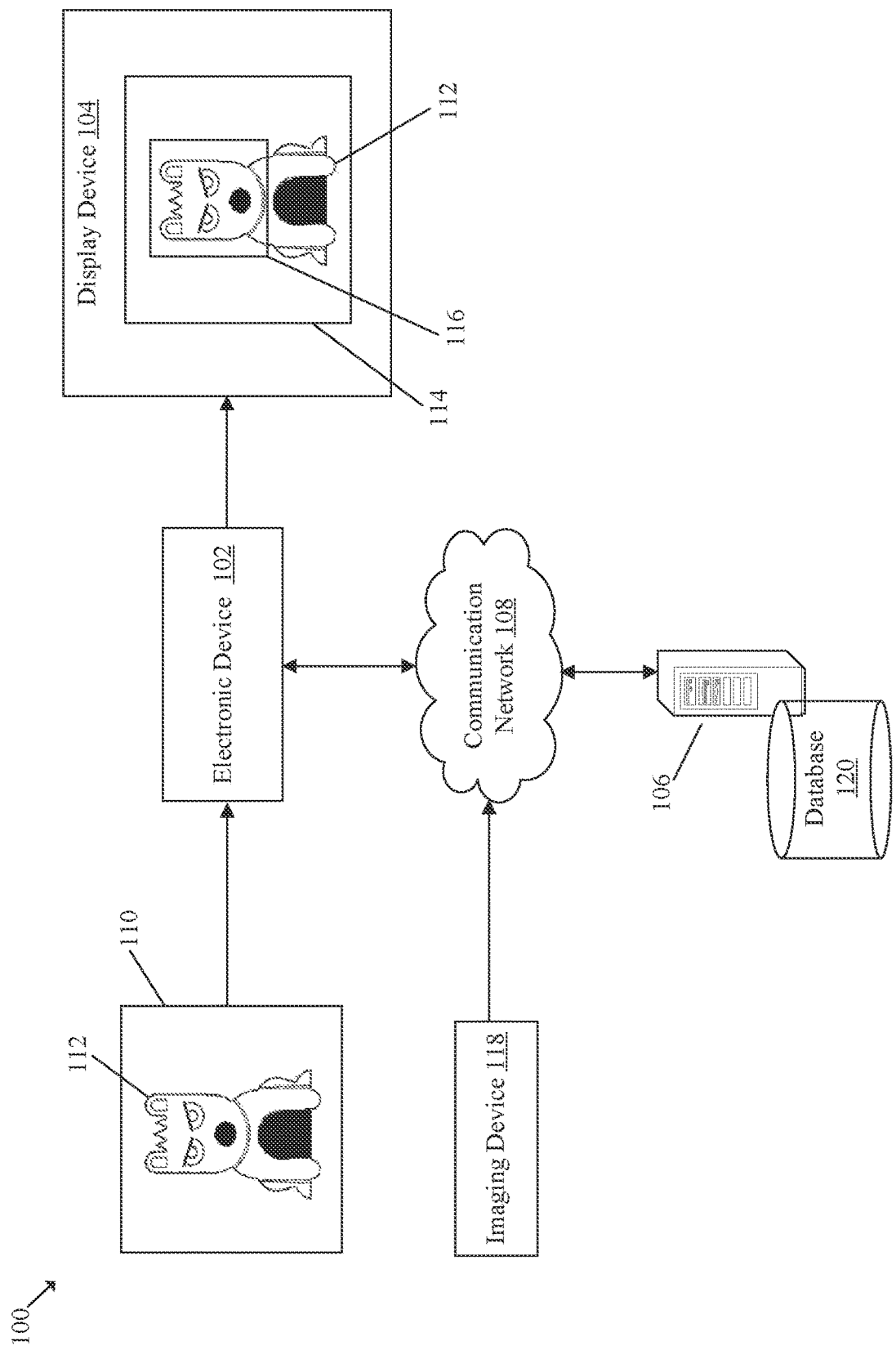
FIG. 1 is a block diagram that illustrates an exemplary network environment for face detection based on facial keypoints, in accordance with an embodiment of the disclosure.

The following described implementations may be found in the disclosed electronic device and method for face detection based on facial keypoints. Operations described in the method, when executed on the electronic device, may detect a face of an object (e.g., animal) in an image quickly based on facial keypoints associated with the face of the object. At any time-instant, the electronic device may receive an image that includes an object. The object in the image may be, for example, an animal or inanimate object that appears like an animal or a caricature of the animal. The electronic device may detect a set of facial keypoints on the face of the object in the image. The set of facial keypoints may correspond to a set of facial features of the object. Based on the detected set of facial keypoints, the electronic device may identify a face pose of the object in the image. After pose estimation, the electronic device may compute a set of values associated with a size and a position of a face bounding box in the image. Such values may be computed based on the face pose and locations of the set of facial keypoints in the image. The electronic device may overlay the face bounding box on the image based on the computed set of values.

In contrast to conventional techniques that use sophisticated neural networks for face detection, the disclosed electronic device may accurately generate face bounding box using merely the facial keypoints for objects, such as animals (especially mammals). From facial keypoints, the disclosed electronic device may identify a pose of the face. Based on the identified pose, the disclosed electronic device may solve equations of computational geometry using the facial keypoints as input to compute a size and a position of the face bounding box. The equations may have a lower computational complexity and a lower memory footprint in comparison to popular techniques, especially ones that directly use neural networks for prediction of face bounding box. Thus, it may be possible to implement disclosed method for object detection on resource-constrained devices, such as an edge IOT device or a camera.

Since the disclosed method relies merely on location of keypoints and certain assumptions on a topology of object's face (e.g., animal face) to compute the size and the position of the face bounding box, the disclosed method may use less resources as compared to approaches that use neural networks for face bounding box prediction. that indicates the face of the animal. Thereafter, a device (such as the disclosed electronic device) that executes operations of the disclosed method may be able to execute other non-trivial processes/operations, without any constraint on the computational resources, power resources, and/or memory resources of the device. The detection of facial keypoints and prediction of face bounding boxes can be performed on low budget devices that may be constrained by computation power or memory. Therefore, the disclosed electronic device may be able to determine the face bounding box quickly, effectively, and in an inexpensive manner as compared to the conventional techniques known in the art.

FIG. 1 is a block diagram that illustrates an exemplary network environment for face detection based on facial keypoints, in accordance with an embodiment of the disclosure. With reference to FIG. 1, there is shown a network environment 100. The network environment 100 may include an electronic device 102, a display device 104, a server 106, a communication network 108, an imaging device 118, and a database 120. With reference to FIG. 1, there is further shown an image 110 of the object 112. The object 112 may be, for example, an animal (e.g., a mammal), a caricature or a cartoonish representation of an animal, and the like. The image 110 is shown to include a face of the object 112.

The electronic device 102 may include suitable logic, circuitry, interfaces, and or code that may be configured to execute a set of operations to perform a face pose detection and a face bounding box estimation for the object 112 in the image 110. The operations may be executed based on a set of facial keypoints that may be detected by application of a suitable computer vision technique or a neural network (e.g., a keypoint detector network) on the image 110. Examples of the electronic device 102 may include, but are not limited to, a computing device, a smartphone, a cellular phone, a mobile phone, a gaming device, a mainframe machine, a server, a computer workstation, a consumer electronic (CE) device and/or any other device with image processing capabilities.

The display device 104 may include suitable logic, circuitry, and interfaces that may be configured to render an image (such as the image 110) with a face bounding box 116 overlaid on the image 110. In accordance with an embodiment, the display device 104 may be a touch screen that enables a user to provide a user input via the display device 104. The display device 104 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 104 may refer to a display screen of a head mounted device (HMD), a smart-glass device, a see-through display, a projection-based display, an electro-chromic display, or a transparent display.

The server 106 may include suitable logic, circuitry, interfaces, and code that may be configured to store the image 110 and metadata (such as height and width) associated with the received image 110. In some embodiments, the server 106 may be configured to also store information associated with facial keypoints and coordinate values associated with the keypoints and other points around the face.

Examples of the server 106 may include, but are not limited to a database server, a file server, a web server, a media server, an application server, a mainframe server, a cloud server, or other types of servers. In cloud implementation, the server 106 may execute operations through web applications, cloud applications, HTTP requests, repository operations, file transfer, and the like. In one or more embodiments, the server 106 may be implemented via a plurality of distributed cloud-based resources by use of several technologies that are well known to those skilled in the art. A person of ordinary skill in the art will understand that the scope of the disclosure may not be limited to implementation of the server 106 and the electronic device 102 as separate entities. In certain embodiments, the functionalities of the server 106 may be incorporated in its entirety or at least partially in the electronic device 102, without a departure from the scope of the disclosure.

The communication network 108 may include a communication medium through which the electronic device 102, the display device 104, the server 106, the imaging device 118, and the database 120 may communicate with each other. The communication network 108 may be a wired or wireless communication network. Examples of the communication network 108 may include, but are not limited to, the Internet, a cloud network, a Wireless Fidelity (Wi-Fi) network, a Personal Area Network (PAN), a Local Area Network (LAN), a mobile network (e.g., a $4^{th}$ Generation or a $5^{th}$ Generation network), or a Metropolitan Area Network (MAN). Various devices in the network environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The imaging device 118 may include suitable logic, circuitry, and interfaces that may be configured to capture the image 110 of the object 112. Additionally, or alternatively, the imaging device 118 may include an imaging software, which when executed, may capture the image 110 based on user input from a user. The imaging device 118 may transfer the generated image 110 to the electronic device 102. In an embodiment, the imaging device 118 may transfer the generated image 110 to the server 106 for storage. Examples of the imaging device 118 may include, but are not limited to, an image sensor, a wide-angle camera, an action camera, a closed-circuit television (CCTV) camera, a camcorder, a digital camera, camera phones, a time-of-flight camera (ToF camera), a night-vision camera, and/or other image capture devices.

The database 120 may include suitable logic, interfaces, and/or code that may be configured to store the image 110 and metadata (such as height and width) associated with the image 110. The database 120 may be a relational or a non-relational database. Also, in some cases, the database 120 may be cached and stored on the electronic device 102. The server 106 may be configured to receive a query for the image 110 from the electronic device 102, via the communication network 108. In response, the server 106 may retrieve and provide the queried image 110 to the electronic device 102, via the communication network 108.

Though not shown in FIG. 1, a neural network (NN) model 122 may be stored locally on the electronic device

102. As an example, the NN model 122 may be stored in the memory 210 of the electronic device 102 and may be pre-trained to detect facial keypoints on the face of the object 112 in the image 110.

In operation, the electronic device 102 may receive the image 110 of the object 112. The object 112 may be an animate or an inanimate object which bears resemblance to or is a depiction of an animal, such as a mammal like a dog, a cat, a cow, a horse, and the like. The image 110 may include a face of the object 112. Based on the reception of the image 110, the electronic device 102 may detect a set of facial keypoints on the face of the object 112 in the image 110. The set of facial keypoints may correspond to a set of facial features of the object 112. By way of example, and not limitation, the set of facial features may include at least one of a nose, a left ear, a right ear, a left eye, or a right eye of the object 112. Additionally, or alternatively, the set of facial features may include other parts such as lips, mouth, horn(s), tusks, unique face markings (e.g., face stripes on tiger's face), or other mammalian face features. Each facial keypoint may indicate a location of a corresponding facial feature of the set of facial features in the image 110. The location may be represented in terms of 2D pixel coordinates with origin (0, 0) as one of the four corners (preferably the top left corner) or a center pixel of the image 110. Details about the detection of the set of facial keypoints are provided, for example, in FIG. 3.

After keypoint detection, the electronic device 102 may identify a face pose of the object 112 in the image 110. By way of example, and not limitation, the face pose of the object 112 may be identified as one of three face poses, i.e., a frontal pose, a right profile pose, or a left profile pose. The identification of the face pose may be performed based on the set of facial keypoints. A correlation exists between absence or presence of certain facial features and a particular face pose. Specifically, the face pose may be identified based on one or more facial features that can be identified from the image 110 based on the set of facial keypoints. In accordance with an embodiment, the face pose may be identified in terms of a relative orientation (yaw, roll, and/or pitch) of the head of the object 112 in two or three dimensions.

After pose estimation, the electronic device 102 may be configured to compute a set of values that may be associated with a size and a position of a face bounding box 116 in the image 110. The set of values may be computed based on the identified face pose and locations of the set of facial keypoints in the image 110. In an embodiment, the set of values may include a value of an x-coordinate of a corner of the face bounding box 116, a width of the face bounding box 116, and a value of a y-coordinate of a facial keypoint that corresponds to one of a left eye or a right eye of the object 112. In accordance with an embodiment, the set of values may include certain reference locations (other than keypoint locations) that may be used to compute the size or the position of the face bounding box 116.

The electronic device 102 may overlay the face bounding box 116 on the image 110 based on the computed set of values. In FIG. 1, the face bounding box 116 is shown to include the face of the dog in the image 110, for example. Since the electronic device 102 relies merely on the locations of the facial keypoints (with certain assumptions about a topology of an animal's face) and the face pose, estimation or prediction of the face bounding box 116 on the electronic device 102 may require a much smaller number of computations as compared to computations performed using conventional neural network(s) to predict a similar face bounding box. With lesser computations, memory and computational resources of the electronic device 102 may not be constrained or severely consumed by the computations required for estimation or prediction of the face bounding box 116. For some devices, the availability of such resources may improve for other crucial or non-trivial processes executable on the electronic device 102.

Figure 2:
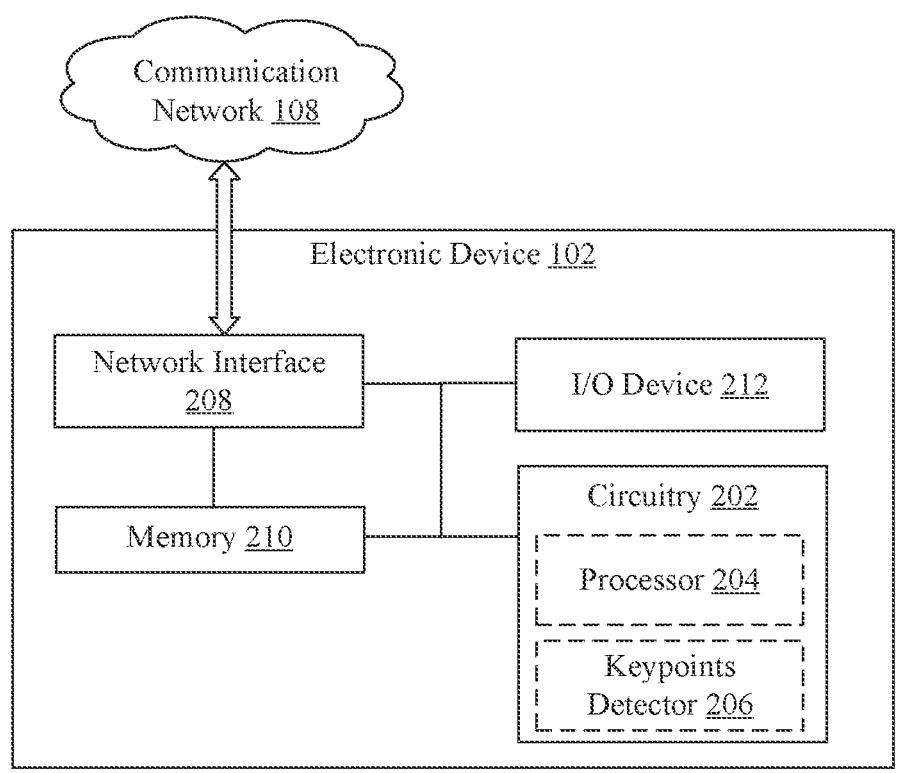
FIG. 2 is a block diagram that illustrates an exemplary electronic device for face detection based on facial keypoints, in accordance with an embodiment of the disclosure

FIG. 2 is a block diagram that illustrates an exemplary electronic device for face detection based on facial keypoints, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202 which may perform operations for face detection based on facial keypoints. The circuitry 202 may include a processor 204 and a keypoints detector 206. The electronic device 102 may further include a network interface 208, a memory 210, and an input/output (I/O) device 212. Alternatively, the memory 210 may include the NN model 122. The circuitry 202 may be communicatively coupled to the memory 210, the I/O device 212, the network interface 208, and the NN model 122.

The circuitry 202 may include suitable logic, circuitry, and interfaces that may be configured to execute program instructions associated with different operations to be executed by the electronic device 102. For example, some of the operations may include reception of the image 110, detection of the set of facial keypoints, identification of the face pose of the object 112 in the image 110, computation of the set of values associated with the face bounding box 116, and overlay of the face bounding box 116 on the image 110. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The processor 204 may include suitable logic, circuitry, and interfaces that may be configured to execute a set of instructions stored in the memory 210. The processor 204 may be configured to execute program instructions associated with different operations to be executed by the electronic device 102. For example, some of the operations may include reception of the image 110, detection of the set of facial keypoints, identification of the face pose of the object 112 in the image 110, computation of the set of values associated with the face bounding box 116, and overlay of the face bounding box 116 on the image 110. The processor 204 may be implemented based on a number of processor technologies known in the art. Examples of the processor technologies may include, but are not limited to, a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), and other processors.

The keypoints detector 206 may include suitable logic, circuitry, and interfaces that may be configured to execute program instructions associated with the detection of the set of facial keypoints on the face of the object 112 in the image 110. In an embodiment, the keypoints detector 206 may be a software that processes instructions associated with the detection of the set of facial keypoints on the face of the object 112 in the image 110. Further, in an embodiment, the keypoints detector 206 works in association with the NN model 122 included in the memory 210 to detect the set of facial keypoints on the face of the object 112 in the image 110. The keypoints detector 206 may be implemented based on a number of processor technologies known in the art. Examples of implementations of the keypoints detector 206 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The network interface 208 may include suitable logic, circuitry, and interfaces that may be configured to facilitate communication between the circuitry 202 and the server 106, via the communication network 108. The network interface 208 may be implemented by use of various known technologies to support wired or wireless communication of the electronic device 102 with the communication network 108. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The memory 210 may comprise suitable logic, circuitry, interfaces, and/or code that may be configured to store the received image 110, and the set of facial keypoints. The memory 210 may be configured to store pose information, pixel distance information, a height and a width of the image 110, a plurality of variables, and a value of a set of constants. The memory 210 may be further configured to store the NN model 122. Examples of implementation of the memory 210 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 212 may include suitable logic, circuitry, and interfaces that may be configured to receive the user input(s) and provide an output based on the received user input(s). The I/O device 212 may be configured to display the face bounding box 116 overlaid on the face of the object 112. The I/O device 212 which may include various input and output devices, which may be configured to communicate with the circuitry 202. Examples of the I/O device 212 may include, but are not limited to, the display device 104, an audio rendering device, a touch screen, a keyboard, a mouse, a joystick, and a microphone.

The NN model 122 may be a computational network or a system of artificial neurons, arranged in a plurality of layers, as nodes. The plurality of layers of the NN model 122 may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the NN model 122. Outputs of each hidden layer may be coupled to inputs of at least one node in other layers of the NN model 122. Node(s) in the final layer may receive inputs from at least one hidden layer to output a result. The number of layers and the number of nodes in each layer may be determined from hyper-parameters of the NN model 122. Such hyper-parameters may be set before, while training, or after training the NN model 122 on a training dataset.

Each node of the NN model 122 may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the NN model 122. All or some of the nodes of the NN model 122 may correspond to the same or a different mathematical function.

In training of the NN model 122, one or more parameters of each node of the NN model 122 may be updated based on whether an output of the final layer for a given input (from the training dataset) matches a correct result based on a loss function for the NN model 122. The above process may be repeated for the same or a different input until a minima of loss function may be achieved, and a training error may be minimized. Several methods for training are known in art, for example, gradient descent, stochastic gradient descent, batch gradient descent, gradient boost, meta-heuristics, and the like.

The NN model 122 may include electronic data, which may be implemented as, for example, a software component of an application executable on the electronic device 102. The NN model 122 may rely on libraries, external scripts, or other logic/instructions for execution by a processing device, such as the circuitry 202. The NN model 122 may include code and routines configured to enable a computing device, such as the keypoints detector 206 to perform one or more operations for detection of the set of facial keypoints associated with the face from the received image 110 of the object 112. Additionally, or alternatively, the NN model 122 may be implemented using hardware including a processor, a microprocessor (e.g., to perform or control performance of one or more operations), a field-programmable gate array (FPGA), or an application-specific integrated circuit (ASIC). Alternatively, in some embodiments, the NN model 122 may be implemented using a combination of hardware and software. Examples of the NN model 122 may include, but are not limited to, a deep neural network (DNN), a convolutional neural network (CNN), a fully connected neural network, and/or a combination of such networks. Various operations of the circuitry 202 are described further, for example, in FIGS. 3, 4, 5A, and 5B.

Figure 3:
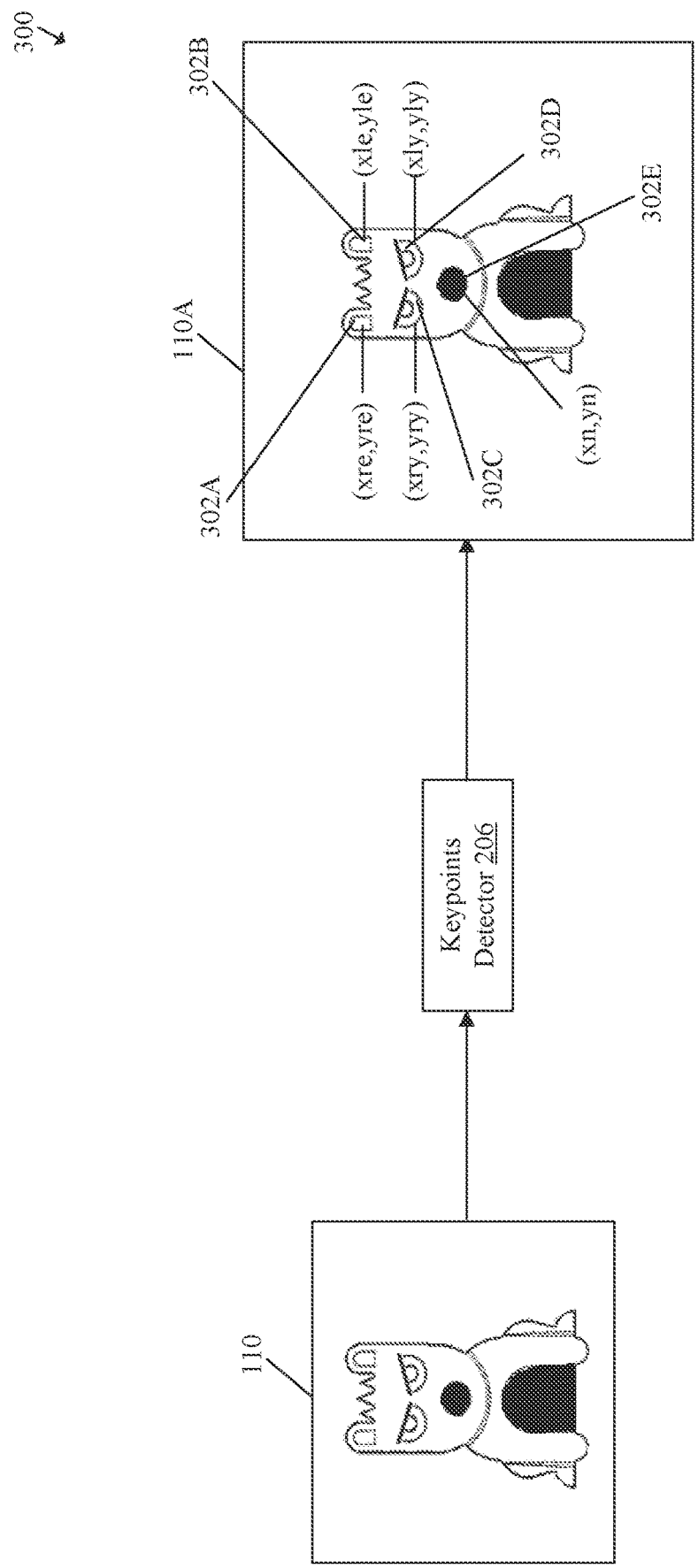
FIG. 3 is a block diagram that illustrates an exemplary keypoints detector for detection of facial keypoints, in accordance with an embodiment of the disclosure.

FIG. 3 is a block diagram that illustrates an exemplary keypoints detector for detection of facial keypoints, in accordance with an embodiment of the disclosure. FIG. 3 is explained in conjunction with elements from FIG. 1 and FIG. 2. With reference to FIG. 3, there is shown a block diagram 300 that illustrates exemplary operations for reception of the image 110 and detection of the facial keypoints on the face of the object 112 in the received image 110. The exemplary operations illustrated in the block diagram 300 may be performed by any computing system, apparatus, or device, such as by the keypoints detector 206, the electronic device 102 of FIG. 1, or the circuitry 202 of FIG. 2. Although illustrated with a single block, the exemplary operations of the block diagram 300 may be divided into additional blocks, depending on the particular implementation.

The keypoints detector 206 may receive the image 110 from the imaging device 118 or the database 120 stored on the server 106 (or cached on the electronic device 102). The database 120 may include images of object(s), such as animate objects that depict mammals or an inanimate objects (e.g., a painting, a caricature, a cartoon, a 2D render of a 3D animal model, or a toy model of an animal) that bears resemblance to an animal with mammalian features.

In accordance with an embodiment, the electronic device 102 or the circuitry 202 may receive an input through the I/O device 212. The input may be provided by a user and may correspond to a user request to perform a face bounding box estimation for the image 110. If the electronic device 102 is a camera or a device with a camera, then the input may be provided via a physical button or an electronic UI displayed on an electronic viewfinder or a display screen of the electronic device 102. In some instances, the input from the user may cause the electronic device 102 to request the server 106 for the image 110 via an Application Programming Interface (API) call or a webhook request. In response to the request, the server may retrieve the image 110 from the database 120 and may transfer the image 110 to the keypoints detector 206 the electronic device 102.

The keypoints detector 206 may perform a keypoints detection operation on the received image 110. In the keypoints detection operation, the keypoints detector 206 may detect a set of facial keypoints associated with the face of the object 112, based on the received image 110. The set of facial keypoints may correspond to a set of facial features of the object 112. Each facial keypoint of the set of facial keypoints may be referred as a facial landmark. As an example, the set of facial features includes at least one of a nose, a left ear, a right ear, a left eye, or a right eye of the object. The set of facial keypoints may include a first keypoint 302A representing the right ear, a second keypoint 302B representing the left ear, a third keypoint 302C representing the right eye, a fourth keypoint 302D representing the left eye, and a fifth keypoint 302E representing the nose of the object 112 in the image 110. In accordance with an embodiment, the set of facial keypoints may include keypoints that are different from the first keypoint 302A, the second keypoint 302B, the third keypoint 302C, the fourth keypoint 302D, and the fifth keypoint 302E in the image 110. In such a case, the set of facial features may include unique features that are different from the right ear, the left ear, the right eye, the left eye, and the nose. For example, the unique features may be mammalian features such as tusks, horns, lips, face stripes (e.g., face stripes on Tiger's face), or features associated with color, shape, or arrangement of facial hair.

In an embodiment, the keypoints detector 206 may be configured to apply the NN model 122 on the received image 110 of the object 112. The NN model 122 may be a machine learning model that is trained to detect the set of facial keypoints associated with the face of the object 112. Based on the application of the NN model 122 on the received image 110, the keypoints detector 206 may be configured to detect the set of facial keypoints.

Each keypoint may be identified by coordinates (x, y) in the image 110 with reference to an origin (e.g., a left top corner of the image). Coordinates associated with each facial keypoint indicate a location (i.e., a 2D location) of a corresponding facial feature in the image 110. In accordance with an embodiment, the NN model 122 may output the coordinates of the set of facial keypoints. For example, the coordinates associated with the first keypoint 302A (i.e. the right ear) may be (xre, yre). The coordinates associated with the second keypoint 302B (i.e. the left ear) may be (xle, yle). The coordinates associated with the third keypoint 302C (i.e. the right eye) may be (xry, yry). The coordinates associated with the fourth keypoint 302D (i.e. the left eye) may be (xly, yly). Similarly, the coordinates associated with the fifth keypoint 302E (i.e. the nose) may be $(x_n, y_n)$.

In certain scenarios, one or more facial features may not be visible in the image due to pose variations. In such scenarios, the coordinates associated with the corresponding keypoints may be set as null. For example, if the image 110 of a dog is captured from the right side, then it is possible that the left ear and the left eye of the dog are not be visible in the image. The coordinates associated with the left ear and the left eye may be null. The coordinates associated with each of the set of facial keypoints may be stored in the memory 210 of the electronic device 102. In addition to the keypoints, dimensions of the image 110 may be determined for face bounding box estimation. The processor 204 may determine the dimensions (i.e., a width (W) and a height (H)) of the received image 110. The dimensions may be represented in terms of pixels, for example.

In an embodiment, the keypoints detector 206 may generate image metadata 110A that includes, for example, the coordinates associated with each facial keypoint, the width (W), the height (H) of the image 110, and the like. Various operations of the circuitry 202 of using the image metadata 110A are described further, for example, in FIGS. 4A, 4B, and 5.

Figure 4A:
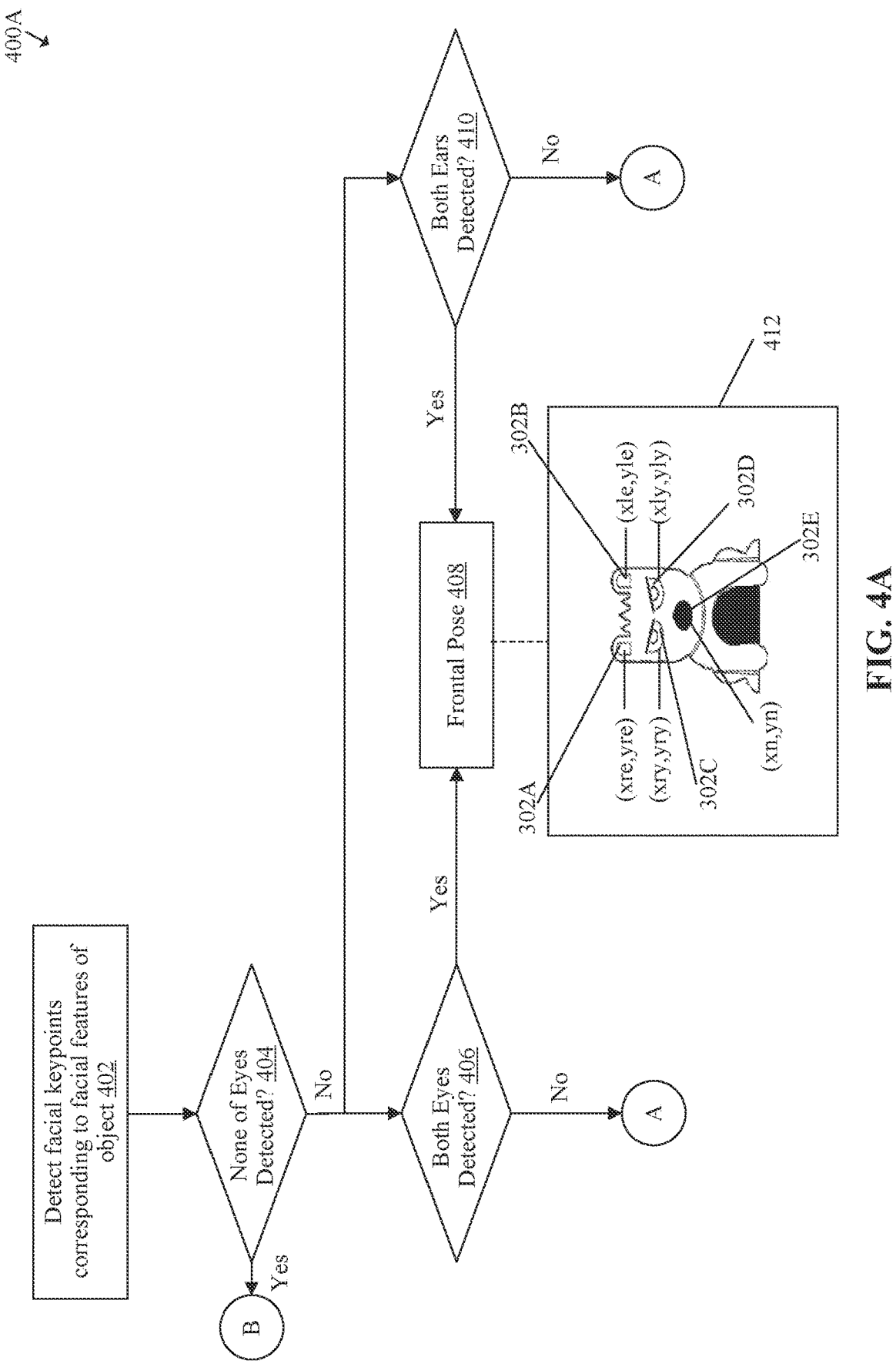
FIGS. 4A and 4B are diagrams that collectively illustrate exemplary operations for face pose estimation based on facial keypoints, in accordance with an embodiment of the disclosure.
Figure 4B:
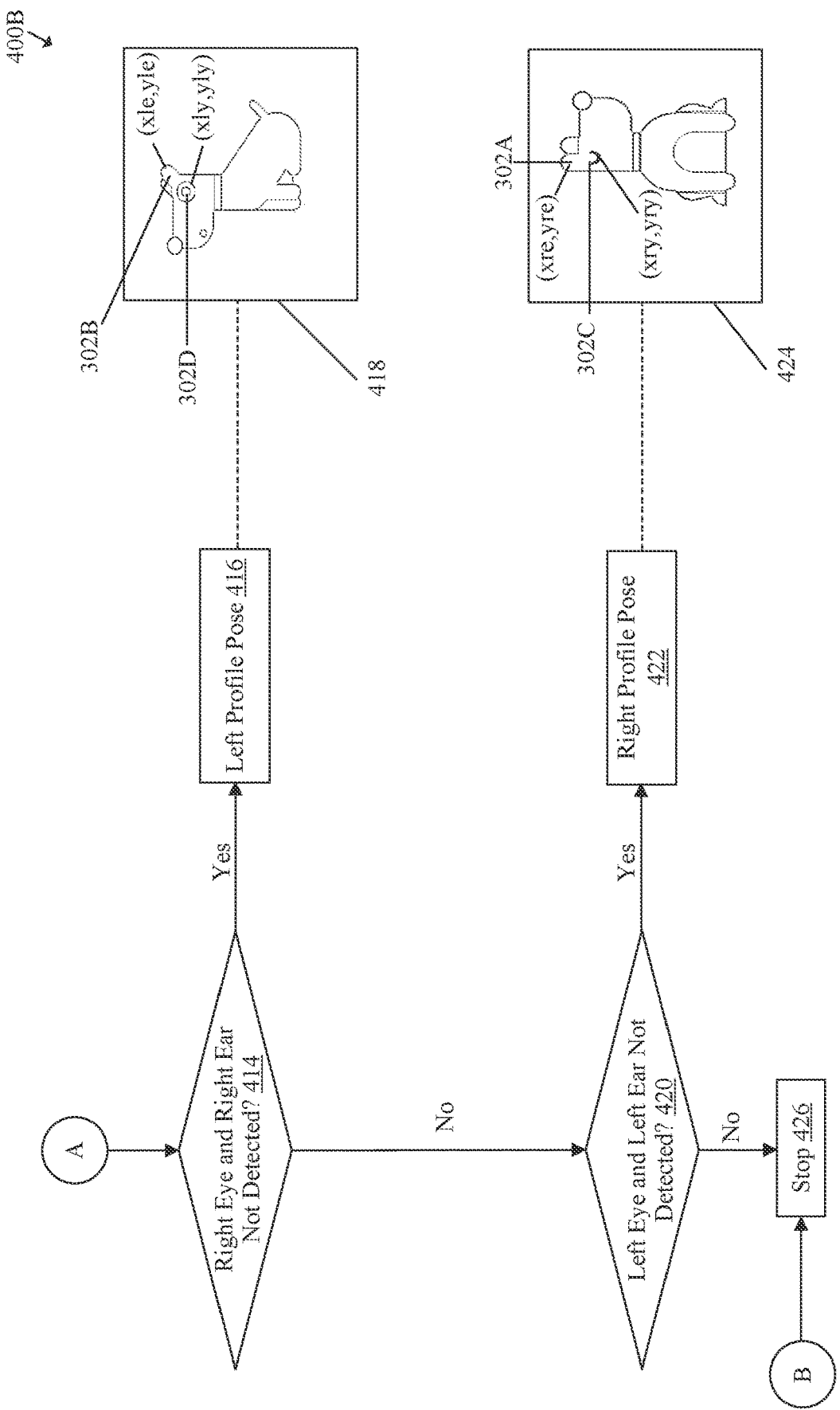

FIGS. 4A and 4B are diagrams that collectively illustrate exemplary operations for face pose estimation based on facial keypoints, in accordance with an embodiment of the disclosure. FIGS. 4A and 4B are explained in conjunction with elements from FIG. 1, FIG. 2, and FIG. 3. With reference to FIGS. 4A and 4B, there are shown block diagrams 400A and 400B that illustrate exemplary operations for determination of the face pose of the object 112 in the image 110. The exemplary operations illustrated in the block diagram 400A and 400B may be performed by any computing system, apparatus, or device, such as by the electronic device 102 of FIG. 1, or the circuitry 202 of FIG. 2.

At 402, the keypoints detector 206 of the electronic device 102 may be configured to detect the set of facial keypoints on the face of the object 112 in the received image 110. The set of facial keypoints may be 2D locations of the set of facial features such as eyes, ears, or nose in the image 110 of the object 112. In an embodiment, the received image 110 may be provided as an input to the trained NN model 122. The trained NN model 122 may identify and classify the facial features of the object 112 into the set of facial features.

Further, the trained NN model 122 may output 2D locations of the set of facial features in the form of the set of facial keypoints. As shown, for example, the set of facial keypoints may include the first keypoint 302A with the coordinates (xre, yre) corresponding to the right ear, the second keypoint 302B with the coordinates (xle, yle) corresponding to the left ear, the third keypoint 302C with the coordinates (xry, yry) corresponding to the right eye, the fourth keypoint 302D with the coordinates (xly, yly) corresponding to the left eye, and the fifth keypoint 302E with the coordinates ($x_n$, $y_n$) corresponding to the nose.

At 404, if none of the left eye and the right eye are detected in the image 110 of the object 112, the processor 204 may determine that the object 112 is not recognizable and the pose of the face of the object 112 cannot be recognized. In an embodiment, the processor 204 may be configured to receive the set of facial keypoints from the keypoints detector 206 and determine a value associated with each facial keypoint of the set of facial keypoints. In case the value associated with the third keypoint 302C and the fourth keypoint 302D is null, the pose of the face of the object 112 may not be determined and the control may transfer to 426. In case at least one of the left eye or the right eye is detected, the control may transfer to the operations described at 406 or 410. As an example, the control may transfer to the operations described at 406 or 410 when the value associated with at least one of the third keypoint 302C or the fourth keypoint 302D is not null.

At 406, if both the left eye and the right eye are detected in the image 110 of the object 112, the processor 204 may determine the object 112 to have the frontal pose 408. In case the value associated with the third keypoint 302C and the fourth keypoint 302D is not null, the object 112 may be determined to have the frontal pose 408. In case the condition specified in the step 406 is not satisfied, the control may transfer to 414. As an example, the condition specified in the step 406 may not be satisfied if one of the left eye or the right eye is not detected. As another example, if the value associated with one of the third keypoint 302C or the fourth keypoint 302D is null, the control may transfer to 414. Shown as an example, the object in the image 412 has a frontal pose and the value of coordinates associated with keypoints (corresponding to the left eye and the right eye) is not null.

At 410, if both the left ear and the right ear are detected in the image 110 of the object 112, then the processor 204 may determine the object 112 to have the frontal pose 408. In case the values associated with the first keypoint 302A and the second keypoint 302B are not null, the object 112 may be determined to have the frontal pose 408. In case the condition specified at 410 is not satisfied, the control may transfer to 414. As an example, the condition specified at 410 may not be satisfied if one of the left ear or the right ear is not detected. As another example, if the value associated with one of the first keypoint 302A or the second keypoint 302B is null, the control may transfer to 414. Shown as an example, the object in the image 412 has a frontal pose and the value of coordinates associated with keypoints (corresponding to the left ear and the right ear) is not null.

At 414, if both the right eye and the right ear are not detected in the image 110 of the object 112, the processor 204 may determine the object 112 to have the left profile pose 416. In case values associated with the first keypoint 302A and the third keypoint 302C are null, the object 112 may be determined to have the frontal pose 408. In case the condition specified at 414 is not satisfied, the control may transfer to 420. Shown as an example, the object in the image 418 has a left profile pose and the value of coordinates associated with keypoints (corresponding to the left eye and the left ear) are not null.

At 420, if both the left eye and the left ear are not detected in the image 110 of the object 112, the processor 204 may determine the object 112 to have the right profile pose 422. In case values associated with the second keypoint 302B and the fourth keypoint 302D are null, the object 112 may be determined to have the right profile pose 422. In case the condition specified at 420 is not satisfied, the control may transfer to 426. Shown as an example, the object in the image 424 has a right profile pose and the values of coordinates associated with keypoints corresponding to the right eye and the right ear are not null. At 426, control may pass to end.

Figure 5:
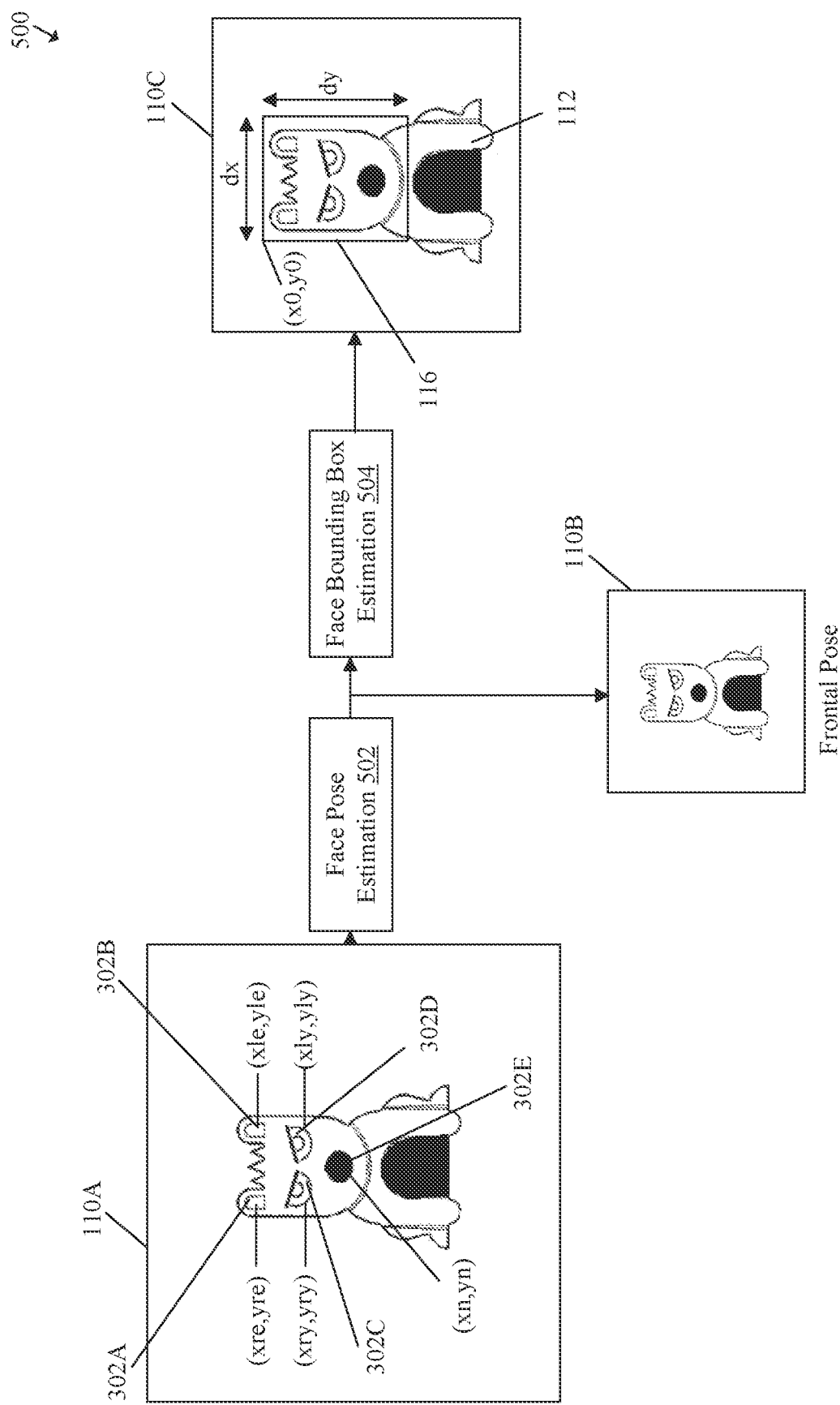
FIG. 5 is a block diagram that collectively illustrates exemplary operations for face detection based on facial keypoints, in accordance with an embodiment of the disclosure.

FIG. 5 is a block diagram that collectively illustrates exemplary operations for face detection based on facial keypoints, in accordance with an embodiment of the disclosure. FIG. 5 is explained in conjunction with elements from FIG. 1, FIG. 2, FIG. 3, FIG. 4A, and FIG. 4B. With reference to FIG. 5, there is shown a block diagram 500 that illustrates exemplary operations for identification of a face pose of the object 112, and estimation of face bounding box 116 for the object 112. The exemplary operations illustrated in the block diagram 500 may be performed by any computing system, apparatus, or device, such as by the electronic device 102 of FIG. 1, or the circuitry 202 of FIG. 2. Although illustrated with two blocks, the exemplary operations of the block diagram 500 may be divided into additional blocks, depending on the particular implementation.

At 502, a face pose identification may be performed. The processor 204 may identify the face pose of the object 112 in the image 110 based on the set of facial keypoints and may compute a set of values associated with a size and a position of a face bounding box (e.g., face bounding box 116) in the image 110. The computation may be based on the identified face pose and locations of the set of facial keypoints in the image. In an embodiment, the set of values may include a value of an x-coordinate of a corner of the face bounding box 116, a width of the face bounding box 116, and a value of a y-coordinate of a facial keypoint that corresponds to one of a left eye or a right eye of the object 112. In accordance with an embodiment, the set of values may include certain reference locations (i.e., variable values other than keypoint locations and pose) that may be used to compute the size or the position of the face bounding box 116, as described herein.

The processor 204 may compute a first set of variable values (pose, x0, x1, y) and a second set of variable values (dx). The first set of variable values (pose, x0, x1, y) may include a pose value that identifies the face pose of the object 112, as shown by a pose tag 110B (i.e., a frontal pose). The identification of the face pose may be performed by solving a first set of equations and the estimation of the face bounding box 116 may be performed by solving a second set of equations, as described herein. The solution of the first set of equations may include a first set of variable values, including a value of a pose variable. Remaining variable values (x0, x1, y) of the solution may be directly used to solve the second set of equations for estimation of the face bounding box 116. Specifically, the remaining values may be used in the computation of the set of values associated with a size (dx, dy) and a position (x0, Y0) of the face bounding box 116.

The first set of variable values may include a first variable value, a second variable value, a third variable value, and a pose value. The first variable value may be associated with a variable ($x_0$) and may correspond to a horizontal value of at least one coordinate associated with a facial keypoint of the set of facial keypoints. As an example, the variable ($x_0$) may indicate a x-coordinate of a top-left corner of the face bounding box 116 in the image 110. The second variable value may be associated with a variable ($x_1$) and may correspond to a horizontal value of a coordinate associated with a facial keypoint of the set of keypoints. The second variable value may be different from the first horizontal value. The third variable value may be associated with a third variable (y) and may correspond to a vertical value of a coordinate associated with a facial keypoint of the plurality of facial keypoints. Similarly, the pose variable value may be associated with a pose variable and may correspond to the face pose of the object 112. In accordance with an embodiment, the face pose may correspond to a head pose and may be described in terms of a location and an orientation of the face with respect to a coordination system of a camera that captures the image 110 of the object 112. The orientation of the face may be described in terms of three Euler angles, i.e., yaw, roll, and pitch.

In accordance with an embodiment, the processor 204 may determine the width (W) of the image 304. Based on the width (W), the processor 204 may be configured to determine the first set of variable values. In an embodiment, the first set of variable values may be further determined based on the coordinates associated with each of the set of facial keypoints.

In accordance with an embodiment, the processor 204 may be configured to determine a presence of the facial keypoints (i.e., third keypoint 302C and fourth keypoint 302D) corresponding to the left eye and the right eye in the detected set of facial keypoints. Based on the determination that the facial keypoints corresponding to the left eye and the right eye are present in the set of facial keypoints, the processor 204 may determine the face pose of the object 112 as the frontal pose. Operations to compute a first set of variable values for the frontal pose are described from equations (1) to (6).

If the coordinates associated with the third keypoint 302C and the fourth keypoint 302D are not null or zero (i.e. when both the eyes are detected), then the processor 204 may perform a first set of operations to determine the first set of variable values (pose, $x_0$, $x_1$, y). In case both the eyes are detected, the pose may be identified to be a frontal pose and the value of pose variable may be 0. An example execution of the first set of operations may include execution of a program code to solve equations (1), which is given as follows:

$$x_0 = xry$$

$$x_1 = xly$$

$$y = \min(yly, yry) \quad (1)$$

where,
$x_0$ represents the first variable,
y represents the third variable,
$x_1$ represents the second variable,
xry represents the horizontal value of coordinates associated with the third keypoint 302C (i.e. the right eye),
xly represents the horizontal value of coordinates associated with the fourth keypoint 302D (i.e. the left eye),
yry represents vertical value of coordinates associated with the third keypoint 302C (i.e. the right eye),
yly represents vertical value of coordinates associated with the fourth keypoint 302D (i.e. the left eye), and min(yly, yry) returns a minimum value from yly and yry.

In some cases, the left ear may be detected and the right ear may not be detected in the image 110 based on presence of the facial keypoint corresponding to the left ear (i.e. second keypoint 302B) and absence of the facial keypoint corresponding to the right ear (i.e. first keypoint 302A) in the detected set of facial keypoints. In such cases, the first set of operations may include execution of a program code to solve equations (2), which is given as follows:

$$x_1 = \max(x_1, xle) \quad (2)$$

$$d = x_1 - x_0$$

$$x_0 = x_0 - \frac{d}{3}$$

$$x_1 = x_1 + \frac{d}{3}$$

where,
$x_1$ represents the second variable,
$x_0$ represents the first variable,
d represents a difference between $x_1$ and $x_0$,
xle represents horizontal value of coordinates associated with the second keypoint 302B (i.e. the left ear), and
max ($x_1$, xle) represents a maximum value from $x_1$ and xle.

In some other cases, the left ear may not be detected and the right ear may be detected in the image 110 based on absence of the facial keypoint corresponding to the left ear (i.e. second keypoint 302B) and presence of the facial keypoint corresponding to the right ear (i.e. first keypoint 302A) in the detected set of facial keypoints. In such cases, the first set of operations may include execution of a program code to solve equations (3), which is given as follows:

$$x_1 = \max(x_0, xre)$$

$$x_1 = \max(x_0, xre) \quad (3)$$

$$d = x_1 - x_0$$

$$x_0 = x_0 - \frac{d}{3}$$

$$x_1 = x_1 + \frac{d}{3}$$

where,
$x_1$ represents a second variable,
$x_0$ represents the first variable,
d represents a difference between $x_1$ and $x_0$,
xre represents horizontal value of coordinates associated with the first keypoint 302A (i.e. the right ear), and
max ($x_0$, xre) represents a maximum value from $x_0$ and xre.

In some other cases, neither the left ear nor the right ear may be detected in the image 110 based on absence of the facial keypoint corresponding to the left ear (i.e. second keypoint 302B) and absence of the facial keypoint corresponding to the right ear (i.e. first keypoint 302A) in the detected set of facial keypoints. In such cases, the first set of operations may further include execution of a program code to solve equations (4), which may be given as follows:

$$d = x_1 - x_0 \quad (4)$$

$$x_0 = x_0 - \frac{d}{1.2}$$

$$x_1 = x_1 + \frac{d}{1.2}$$

where, $x_1$ represents a second variable, $x_0$ represents the first variable, and d represents a difference between $x_1$ and $x_0$.

In an embodiment, the first set of operations may further include execution of a program code to solve equations (5), which may be given as follows:

$$x_0 = \max(x_0, 0)$$

$$x_1 = \min(x_1, W) \quad (5)$$

where, $x_1$ represents the second variable, $x_0$ represents the first variable, max ($x_0$, 0) provides maximum value from $x_0$ and 0, W represents the width of the image 110, and min ($x_1$, W) provides minimum value from $x_1$ and W.

In some other cases, the nose may be detected in the image 110 based on presence of a facial keypoint corresponding to the nose (i.e. fifth keypoint 302E) in the detected set of facial keypoints. In such cases, the first set of operations may further include execution of a program code to solve equations (6), which is given as follows:

$$x_0 = \min(x_0, x_n)$$

$$x_1 = \max(x_1, x_n) \quad (6)$$

where, $x_1$ represents the second variable, $x_0$ represents the first variable, $x_n$ represents horizontal value of coordinates associated with the fifth keypoint 302E (i.e., the nose), max ($x_1$, $x_n$) provides maximum value from $x_1$ and $x_n$, and min ($x_0$, $x_n$) provides minimum values from $x_0$ and $x_n$.

In accordance with an embodiment, the processor 204 may be configured to determine presence of the facial keypoints corresponding to the left ear and the right ear (i.e. first keypoint 302A and second keypoint 302B) in the detected set of facial keypoints. Based on the determination that the facial keypoints corresponding to the left ear and the right ear are present in the detected set of facial keypoints, the processor 204 may determine the face pose of the object 112 as a frontal pose. Operations to compute a first set of variable values for the frontal pose are described from equations (7) to (11).

For example, if the coordinates associated with the first keypoint 302A and the second keypoint 302B are not null or zero (i.e. when both the ears may be detected), then the processor 204 may perform a second set of operations to determine the first set of variable values (pose, $x_0$, $x_1$, y). In case both the ears are detected in the image 110, the face pose may be identified as a frontal pose and the value of pose variable may be set to 0. The second set of operations may include, for example, an execution of a program code to solve equations (7), which is given as follows:

$$x_0 = xre \quad (7)$$

$$x_1 = xle$$

$$d = x_1 - x_0$$

$$x_0 = x_0 - \frac{d}{3.5}$$

$$x_1 = x_1 + \frac{d}{3.5}$$

where, $x_0$ represents the first variable, $x_1$ represents the second variable, y represents the third variable, xre represents horizontal value of coordinates associated with the first keypoint 302A (i.e. the right ear), xle represents horizontal value of coordinates associated with the second keypoint 302B (i.e. the left ear), and d represents a difference between x1 and $x_0$.

In some cases, the nose may be detected in the image 110 based on presence of a facial keypoint corresponding to the nose (i.e. fifth keypoint 302E) in the detected set of facial keypoints. In such cases, the second set of operations may include execution of a program code to solve equations (8), which is given as follows:

$$x_0 = \min(x_0, x_n)$$

$$x_1 = \max(x_1, x_n) \quad (8)$$

where, $x_1$ represents the second variable, $x_0$ represents the first variable, $x_n$ represents horizontal value of coordinates associated with the fifth keypoint 302E (i.e., the nose), max ($x_1$, $x_n$) provides maximum value from $x_1$ and $x_n$, and min ($x_0$, $x_n$) provides minimum values from $x_0$ and $x_n$).

In some cases, only the left eye may be detected in the image 110 based on presence of the facial keypoint corresponding to the left eye (i.e., fourth keypoint 302D) in the detected set of facial keypoints. In such cases, the second set of operations may include execution of a program code to solve an equation (9), which is given as follows:

$$y = yly \quad (9)$$

where, y represents the third variable, and yly represents vertical value of coordinates associated with the fourth keypoint 302D (i.e. the left eye).

In some cases, only the right eye may be detected in the image 110 based on a presence of the facial keypoint corresponding to the right eye (i.e. third keypoint 302C) in the detected set of facial keypoints. In such cases, the second set of operations may include execution of a program code to solve an equation (10), which is given as follows:

$$y = yry \quad (10)$$

where, y represents the third variable, and yry represents vertical value of coordinates associated with the third keypoint 302C (i.e. the right eye).

In some cases, both the right eye and the left eye may be detected in the image 110 based on a presence of facial keypoints corresponding to the left eye (i.e., fourth keypoint 302D) and the right eye (i.e., third keypoint 302C) in the detected set of facial keypoints. In such cases, the second set of operations may include execution of a program code to solve equation (11), which is given as follows:

$$y = \min(yly, yry) \quad (11)$$

y represents the third variable, and yry represents vertical value of coordinates associated with the third keypoint 302C (i.e. the right eye), yly represents vertical value of coordinates associated with the fourth keypoint 302D (i.e. the left eye), and min(yly,yry) provides minimum value from yly and yry.

In accordance with an embodiment, the processor 204 may be configured to determine absence of the facial keypoints corresponding to the right eye and the right ear (i.e. third keypoint 302C and first keypoint 302A) in the detected set of facial keypoints. Based on the determination that the facial keypoints corresponding to the right eye and the right ear are absent in the detected set of facial keypoints, the processor 204 may determine the face pose of the object 112 as a left profile pose. Operations to compute the first set of variable values for the left profile pose are described from equations (12) to (15).

For example, if the coordinate values associated with the third keypoint 302C are null or zero (i.e. when the right eye is not detected) and the coordinate values associated with the first keypoint 302A are null or zero (i.e. when the right ear is not detected), then the processor 204 may perform a third set of operations to determine the first set of variable values (pose, $x_0$, $x_1$, y). In case the right eye and the right ear are not detected, the pose may be identified as a left profile pose and the value of pose variable may be set to 1. For example, the third set of operations may include execution of a program code to solve equation (12), which is given as follows:

$$y = yly \qquad (12)$$

where, y represents the third variable, and yly represents vertical value of coordinates associated with the fourth keypoint 302D (i.e. the left eye).

In an embodiment, the coordinate values associated with the second keypoint 302B may not be null or zero (i.e. the left ear may be detected in the image 110 based on presence of facial keypoint corresponding to the left ear (i.e. second keypoint 302B) in the detected set of facial keypoints). In such a scenario, the third set of operations may include execution of a program code to solve equation (13), which is given as follows:

$$x_0 = xly$$

$$x_1 = xle \qquad (13)$$

where, $x_0$ represents the first variable, $x_1$ represents a second variable, xly represents horizontal value of coordinates associated with the fourth keypoint 302D (i.e. the left eye), and xle represents horizontal value of coordinates associated with the second keypoint 302B (i.e. the left ear).

In an embodiment, the coordinate values associated with the fifth keypoint 302E may not be null or zero (i.e., the nose may be detected in the image 110 based on presence of a facial keypoint corresponding to the nose (i.e. fifth keypoint 302E) in the detected set of facial keypoints). In such a scenario, the third set of operations may include execution of a program code to solve equations (14), which is given as follows:

$$x_0 = \min(x_0, x_n)$$

$$x_1 = \min(x_1, x_n) \qquad (14)$$

where, $x_1$ represents the second variable, $x_0$ represents the first variable, $x_n$ represents horizontal value of coordinates associated with the fifth keypoint 302E (i.e., the nose), max ($x_1$, $x_n$) provides maximum value from $x_1$ and $x_n$, and min ($x_0$, $x_n$) provides minimum values from $x_0$ and $x_n$).

In an embodiment, the third set of operations may further include execution of a program code to solve equations (15), which is given as follows:

$$d = x_1 - x_0 \qquad (15)$$

$$x_0 = x_0 - \frac{d}{6}$$

$$x_0 = \max(x_0, 0)$$

where, $x_1$ represents a second variable, $x_0$ represents the first variable, d represents a difference between $x_1$ and $x_0$, and max($x_0$, 0) provides maximum from $x_0$ and 0.

In an embodiment, if the coordinate values associated with the third keypoint 302C are null or zero (i.e. when the right eye is not detected) and the coordinate values associated with the first keypoint 302A are null or zero (i.e. when the right ear is not detected), and the coordinate values associated with the second keypoint 302B may also be null or zero (i.e. left ear is not detected in the image 110). In such a scenario, the value of pose variable may be set to −1. In case the pose variable value is −1, then it may be determined that the face of the object 112 is not visible in the image 110 and the pose of the face may not be determined. An error message may be displayed indicating that the face cannot be detected.

In accordance with an embodiment, the processor 204 may be configured to determine absence of the facial keypoints (i.e., fourth keypoint 302D and second keypoint 302B) corresponding to the left eye and the left ear in the detected set of facial keypoints. Based on the determination that the facial keypoints corresponding to the left eye and the left ear are absent in the set of facial keypoints, the processor 204 may identify the face pose of the object 112 as a right profile pose. Operations with certain variations are described from equations (16) to (19).

For example, if coordinate values associated with the fourth keypoint 302D are null or zero (i.e. when the left eye is not detected) and the coordinate values associated with the second keypoint 302B are null or zero (i.e. when the left ear is not detected), then the circuitry 202 may perform a fourth set of operations to compute the plurality of variable values (pose, $x_0$, $x_1$, y). In a scenario where the left ear and the left eye are not detected, the pose may be a right profile pose and the value of pose variable may be set to 2. For example, the fourth set of operations may include execution of a program code to solve equations (16), which may be given as follows:

$$y = yry \qquad (16)$$

where, y represents the third variable, and yry represents vertical value of coordinates associated with the third keypoint 302C (i.e. the right eye).

In an embodiment, the coordinate values associated with the first keypoint 302A may not be null or zero. In such a scenario, the fourth set of operations may further include execution of a program code to solve equation (17), which may be given as follows:

$$x_0 = xre$$

$$x_1 = xry \tag{17}$$

$x_0$ represents the first variable,
$x_1$ represents the second variable,
xre represents horizontal value of coordinates associated with the first keypoint 302A (i.e. the right ear), and
xry represents horizontal value of coordinates associated with the third keypoint 302C (i.e. the right eye).

In an embodiment, the coordinate values associated with the fifth keypoint 302E may not be null or zero (i.e. nose may be detected in the image 110 based on a presence of facial keypoint corresponding to the nose (i.e. fifth keypoint 302E) in the detected set of facial keypoints). In such a scenario, the fourth set of operations may further include execution of a program code to solve equations (18), which may be given as follows:

$$x_0 = \min(x_0, x_n)$$

$$x_1 = \min(x_1, x_n) \tag{18}$$

where,
$x_1$ represents the second variable,
$x_0$ represents the first variable,
$x_n$ represents horizontal value of coordinates associated with the fifth keypoint 302E (i.e., the nose),
max $(x_1, x_n)$ provides maximum value from $x_1$ and $x_n$, and
min $(x_0, x_n)$ provides minimum values from $x_0$ and $x_n$).

In an embodiment the fourth set of operations may further include execution of a program code to solve equations (19), which may be given as follows:

$$d = x_1 - x_0$$
$$x_1 = x_1 + \frac{d}{6} \tag{19}$$
$$x_1 = \min(x_1, W)$$

where,
$x_1$ represents the second variable,
$x_0$ represents the first variable,
W represents width of the image 110,
D represents difference between the $x_1$ and $x_0$, and
Min($x_1$, w) provides minimum from $x_1$ and W.

In some instances, coordinate values associated with the fourth keypoint 302D may be null or zero (i.e. when the left eye is not detected) and the coordinate values associated with the second keypoint 302B may be null or zero (i.e. when the left ear is not detected), and the coordinate values associated with the first keypoint 302A may be also null or zero (i.e. the right ear may not be detected). In such a scenario, the value of pose variable may be set to −1. If the pose variable value is −1, then it may be determined that the face of the object 112 is not visible in the image 110 and the pose of the face cannot be determined. In such scenarios, an error message may be displayed indicating that the face cannot be detected.

In accordance with an embodiment, the processor 204 may be configured to execute the first set of operations irrespective of whether the coordinate values of each of the set of facial keypoints is (0,0) or any other numerical value. In other words, the execution of the first set of operations may precede the execution of the second set of operations, the third set of operations, or the fourth set of operations. As discussed, if the pose variable value is 0, then it may be determined that the pose is a frontal pose. If the pose variable value is 1, then it may be determined that the pose is a left profile pose. If the value of the pose variable is 2, then it may be determined that the pose is a right profile pose. In case the pose variable value is −1, then it may be determined that the face of the object 112 is not visible in the image 110 and the face bounding box 116 cannot be determined.

The second set of variable values may include a fourth variable value. The fourth variable value may be associated with a width (dx) of the face bounding box 116 that bounds the face of the object 112 in the image 110. In an embodiment, the processor 204 may perform a fifth set of operations to compute the fourth variable value (dx). For example, such a set of operations may include execution of a program code to solve equation (20), which may be given as follows:

$$dx = x_1 - x_0 \tag{20}$$

$x_1$ represents the second variable,
$x_0$ represents the first variable, and
d represents difference between $x_1$ and $x_0$.

In an embodiment, if the value of the fourth variable (dx) is less than a threshold (e.g., 15 pixels), then the value of pose variable may be set to '−1'. Otherwise, the value of the fourth variable (dx) may be the same as that provided in equation (20). It should be noted that if the value of pose is −1, then the pose of the face cannot be determined.

At 504, the estimation of the face bounding box 116 may be performed by the processor 204. Based on the first set of variable values, the second set of variable values, and the height (H) of the image 110, the processor 204 may be configured to compute a third set of variable values for estimation of the face bounding box 116. The third set of variable values may include a fifth variable value and a sixth variable value. The fifth variable value may be associated with a fifth variable ($y_0$) and may correspond to a vertical value of a coordinate associated with at least one facial keypoint of the set of facial keypoints. As an example, the fifth variable ($y_0$) may indicate a y-coordinate of the top-left corner of the face bounding box 116 in the image 110. The sixth variable value may be associated with a sixth variable (dy) and may correspond to a height of the face bounding box 116 around the face of the object 112 in the image 110.

If coordinate values associated with the fifth keypoint 302E are not null or zero (i.e. when the nose is detected), then the processor 204 may perform a sixth set of operations to compute the third set of variable values ($y_0$, dy). For example, the sixth set of operations may include execution of a program code to solve equations (21), which is given as follows:

$$dy_0 = \max(dx, (y_n - y) \times 3)$$

$$dy = \min(dy_0, 1.5 \times dx) \tag{21}$$

where,
dx represents width of the face bounding box 116,
dy represents height of the face bounding box 116,
y represents the third variable,
$y_n$ represents vertical value of coordinates associated with the fifth keypoint 302E (i.e. the nose),
max(dx, $(y_n - y) \times 3$) returns a maximum of dx and $(y_n - y) \times 3$, and
min($dy_0$, 1.5×dx) returns a minimum of $dy_0$ and 1.5×dx.

If coordinate values associated with the fifth keypoint 302E are null or zero (i.e. when the nose is not detected), then the sixth set of operations may further include execution of a program code to solve equation (22), which is given as follows:

$$dy = 1.5 \times dx \qquad (22)$$

where, dx represents width of the face bounding box 116, and dy represents height of the face bounding box 116.

In an embodiment, the value of the pose variable may be 0 (i.e. the pose may be the frontal pose), the sixth set of operations may further include execution of a program code to solve equation (23), which may be given as follows:

$$dy = 1.25 \times dx \qquad (23)$$

where, dx represents width of the face bounding box 116, and dy represents height of the face bounding box 116.

In an embodiment, the value of the pose variable may be 1 (i.e. the pose may be the left profile pose) or the value of the pose variable may be 2 (i.e. the pose may be the right profile pose), the sixth set of operations may include execution of a program code to solve equation (24), which may be given as follows:

$$dy = 1.15 \times dx \qquad (24)$$

where, dx represents width of the face bounding box 116, and dy represents height of the face bounding box 116.

The sixth set of operations may further include execution of a program code to solve equations (25), which may be given as follows:

$$y_0 = y - \left(\frac{dy}{1.9}\right) \qquad (25)$$
$$y_0 = \max(y_0, 0)$$

where, y represents the third variable, dy represents height of the face bounding box 116, $y_0$ represents the fifth variable, and $\max(y_0, 0)$ provides maximum from $y_0$ and 0.

In an embodiment, if the value of $y_0+dy$ is greater than the height (H) of the image 110, then the value of the sixth variable (dy) may be computed using equation (26), which is given as follows. Otherwise, the value of the sixth variable (dy) may be the same as provided by equations (22-25).

$$dy = H - y_0 \qquad (26)$$

dy represents height of the face bounding box 116, $y_0$ represents the fifth variable, and H represents the height of the image 110.

In an embodiment, the processor 204 may be configured to compute a first coordinate value $(x_0, y_0)$ in the image 110. The vertical coordinate $(y_0)$ of the first coordinate value may be computed based on the sixth variable (dy), the height (H) of the image 110, the third variable value (y), and the fourth variable value (dx). The computed first coordinate value may represent a point in the image 110. Specifically, the first coordinate value may represent a first corner for the face bounding box 116 to be determined. The first corner may be a top left corner of the face bounding box 116. In another embodiment, the first corner may be a top right, a bottom right, or a bottom left corner of the face bounding box 116.

The circuitry 202 may be configured to generate the face bounding box 116 based on the set of values that includes at least one of the horizontal coordinate $(x_0)$ of the first coordinate value, the vertical coordinate $(y_0)$ of the first coordinate value, the fourth variable (dx), and the sixth variable (dy). Upon generation, the face bounding box 116 may be overlaid on the face of the object 112 in the image 110 to indicate a location of the face in the image 110. In an embodiment, the circuitry 202 may be configured to control the display device 104 to display the face bounding box 116 on the face of the object 112.

Figure 6:
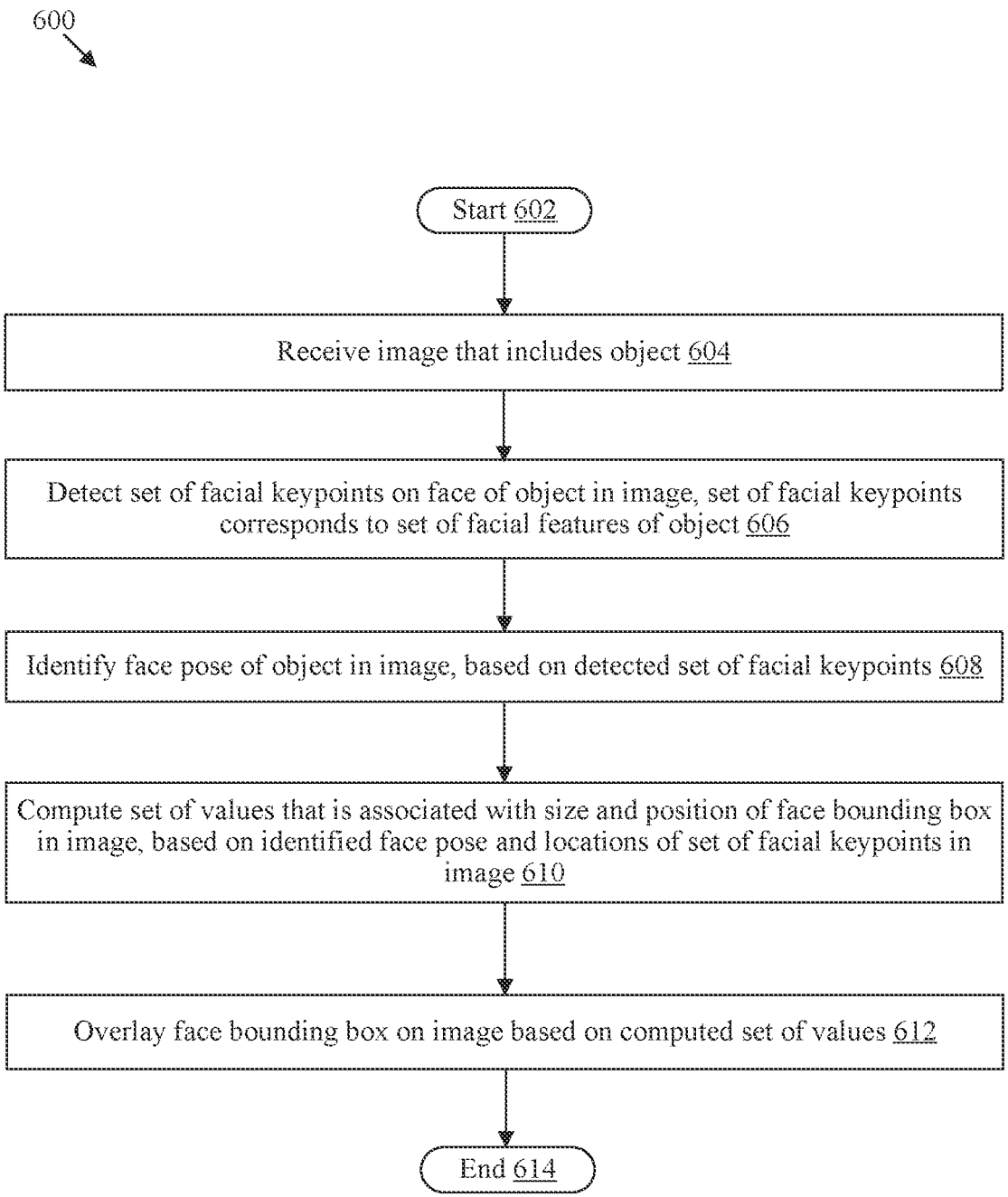
FIG. 6 is a flowchart that illustrates exemplary operations for face detection based on facial keypoints, in accordance with an embodiment of the disclosure.

FIG. 6 is a flowchart that illustrates exemplary operations for face detection based on facial keypoints, in accordance with an embodiment of the disclosure. FIG. 6 is explained in conjunction with elements from FIGS. 1-3, FIG. 4A, FIG. 4B, and FIG. 5. With reference to FIG. 6, there is shown a flowchart 600. The operations from 602 to 614 may be implemented on any computing device, for example, the electronic device 102 or the circuitry 202. The operations may start at 602 and proceed to 604.

At 604, the image 110 of the object 112 may be received and the image 110 may include the object 112. In one or more embodiments, the circuitry 202 may be configured to receive the image 110 of the object 112. The details about the reception of the image 110 of the object 112 are provided for example, in FIGS. 1, 2, and 3.

At 606, the set of facial keypoints on the face of the object 112 in the image 110 may be detected. The set of facial keypoints corresponds to a set of facial features of the object 112. In one or more embodiments, the circuitry 202 may be configured to detect the set of facial keypoints on the face of the object 112 in the image 110, wherein the set of facial keypoints corresponds to the set of facial features of the object 112. The details about the detection of the set of facial keypoints are provided, for example, in FIGS. 1 and 3.

At 608, the face pose of the object 112 in the image 110 may be identified based on the detected set of facial keypoints. In one or more embodiments, the circuitry 202 may be configured to identify the face pose of the object 112 in the image 110, based on the detected set of facial keypoints. The details about identification of the face pose of the object 112 are provided, for example, in FIGS. 4A, 4B, and 5.

At 610, a set of values associated with the size and the position of the face bounding box 116 in the image 110 may be computed based on the identified face pose and locations of the set of facial keypoints in the image 110. In one or more embodiments, the circuitry 202 may be configured to compute the set of values, based on the identified face pose and locations of the set of facial keypoints in the image 110. The details about the computation of the set of values is provided, for example, in FIGS. 1 and 3.

At 612, the face bounding box 116 may be overlaid on the image 110 based on the computed set of values. In one or more embodiments, the circuitry 202 may be configured to overlay the face bounding box 116 on the image 110 based on the computed set of values. Control may pass to end.

Various embodiments of the disclosure may provide a non-transitory computer-readable medium and/or storage medium having stored thereon, computer-executable instructions executable by a machine and/or a computer such as the electronic device 102. The computer-executable instructions may cause the machine and/or computer to perform operations that may include reception of the image 110 that includes the object 112. The operations may further include detection of the set of facial keypoints on the face of the object 112 in the image 110. The set of facial keypoints corresponds to the set of facial features of the object 112.

The operations may further include identification of the face pose of the object 112 in the image 110, based on the detected set of facial keypoints. The operations may further include computation of the set of values that is associated with the size and the position of the face bounding box 116 in the image 110, based on the identified face pose and locations of the set of facial keypoints in the image 110. The operations may further include overlay of the face bounding box 116 on the image 110 based on the computed set of values.

Exemplary aspects of the disclosure may include an electronic device (such as the electronic device 102 of FIG. 1) that may include circuitry (such as the circuitry 202). The circuitry may be configured to receive an image (such as the image 110) that includes an object (such as the object 112). The image includes a face of the object. The electronic device may be further configured to detect a set of facial keypoints on the face of the object in the image. The set of facial keypoints corresponds to a set of facial features of the object. Each facial keypoint of the set of facial keypoints indicates a location of a corresponding facial feature of the set of facial features in the image. The set of facial features includes at least one of a nose, a left ear, a right ear, a left eye, or a right eye of the object. The electronic device may be further configured to identify a face pose of the object in the image, based on the detected set of facial keypoints. The face pose of the object is identified as one of a frontal pose, a right profile pose, or a left profile pose. The electronic device may be further configured to compute a set of values that is associated with a size and a position of a face bounding box (such as the face bounding box 116) in the image, based on the identified face pose and locations of the set of facial keypoints in the image. The set of values may include a value of an x-coordinate of a corner of the face bounding box, a width of the face bounding box, and a value of a y-coordinate of a facial keypoint that corresponds to one of a left eye or a right eye of the object. The electronic device may be further configured to overlay the face bounding box on the image based on the computed set of values.

In accordance with an embodiment, the circuitry may be further configured to determine the face pose as a frontal pose based on a determination that facial keypoints corresponding to left and right eyes are present in the detected set of facial keypoints.

In accordance with an embodiment, the circuitry may be further configured to determine the face pose as a frontal pose (such as the frontal pose of the object in the image 412) based on a determination that facial keypoints corresponding to left and right ears are present in the detected set of facial keypoints.

In accordance with an embodiment, the circuitry may be further configured to determine the face pose as the frontal pose based on a determination that facial keypoints corresponding to left and right ears are present in the detected set of facial keypoints.

In accordance with an embodiment, the circuitry may be further configured to determine the face pose as a left profile pose (such as the left profile pose shown in the image 418) based on a determination that facial keypoints corresponding to the right eye and the right ear are absent in the detected set of facial keypoints.

In accordance with an embodiment, the circuitry may be configured to determine the face pose as a right profile pose (such as the right profile pose shown in the image 424) based on a determination that facial keypoints corresponding to the left eye and the left ear are absent in the detected set of facial keypoints.

In accordance with an embodiment, the circuitry may be configured to compute a value of a y-coordinate of the corner of the face bounding box based on the value of the y-coordinate of the facial keypoint corresponding to one of the left eye or the right eye. The circuitry may be further configured to compute a height of the face bounding box based on the value of the y-coordinate of the corner of the face bounding box, a height of the image, and the width of the face bounding box. The circuitry may be further configured to generate the face bounding box based on the value of the x-coordinate of the corner of the face bounding box, the value of the y-coordinate of the corner of the face bounding box, the height of the face bounding box, and the width of the face bounding box. The set of values includes the value of the y-coordinate of the corner of the face bounding box and the height of the face bounding box.

In accordance with an embodiment, the circuitry may be further configured to control a display device (such as the display device 104) to display a message that indicates that the face bounding box is undefined for the face of the object. In accordance with an embodiment, the message is displayed based on a determination that the width of the face bounding box is less than a threshold width. In accordance with an embodiment, the message is displayed based on a determination that facial keypoints corresponding to left and right eyes are absent in the set of facial keypoints.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. An electronic device, comprising:
   circuitry configured to:
   receive an image that includes an object;
   detect a set of facial keypoints on a face of the object in the image, wherein
   the set of facial keypoints corresponds to a set of facial features of the object, and
   the set of facial keypoints includes a first facial keypoint corresponding to a right eye, a second facial keypoint corresponding to a right ear, a third facial keypoint corresponding to a left eye, and a fourth facial keypoint corresponding to a left ear;
   determine a specific value associated with each facial keypoint of the set of facial keypoints;
   determine a face pose of the object as a left profile pose based on the specific value of each of the first facial keypoint corresponding to the right eye and the second facial keypoint corresponding to the right ear is null;
   determine the face pose as a right profile pose based on the specific value of each of the third facial keypoint corresponding to the left eye and the fourth facial keypoint corresponding to the left ear is null;
   compute a set of values that is associated with a size of a face bounding box in the image and a position of the face bounding box in the image, based on the determined face pose and a set of locations of the set of facial keypoints in the image, wherein
   the set of values includes a first set of variable values and a second set of variable values,
   the first set of variable values includes a pose variable value, a first variable value that corresponds to a first horizontal value of a first coordinate associated with at least one of the set of facial keypoints, a second variable value that corresponds to a second horizontal value of a second coordinate associated with the at least one of the set of facial keypoints, and a third variable value that corresponds to a vertical value of a third coordinate associated with the third facial keypoint,
   based on detection of the fourth facial keypoint of the detected set of facial keypoints, the first coordinate corresponds to a fourth coordinate of the third facial keypoint and the second coordinate corresponds to a fifth coordinate of the fourth facial keypoint,
   the second set of variable values includes a fourth variable value that corresponds to a width of the face bounding box and a fifth variable value that corresponds to a height of the face bounding box,
   each of the first variable value, the second variable value, the third variable value, the fourth variable value, and the fifth variable value is different,
   the first horizontal value is different from the second horizontal value, and
   each of the first coordinate, the second coordinate, the third coordinate, the fourth coordinate, and the fifth coordinate is different; and
   overlay the face bounding box on the image based on the computed set of values.

2. The electronic device according to claim 1, wherein each facial keypoint of the set of facial keypoints indicates a location of the set of locations associated with at least one of the set of facial features in the image.

3. The electronic device according to claim 1, wherein the set of facial features includes at least one of a nose, the left ear, the right ear, the left eye, or the right eye of the object.

4. The electronic device according to claim 1, wherein the face pose of the object is one of a frontal pose, the right profile pose, or the left profile pose.

5. The electronic device according to claim 1, wherein the circuitry is further configured to determine the face pose as a frontal pose based on both the third facial keypoint and the first facial keypoint are present in the detected set of facial keypoints.

6. The electronic device according to claim 1, wherein the circuitry is further configured to determine the face pose as a frontal pose based on both the fourth facial keypoint and the second facial keypoint are present in the detected set of facial keypoints.

7. The electronic device according to claim 1, wherein the circuitry is further configured to determine the face pose as the left profile pose based on both the first facial keypoint and the second facial keypoint are absent in the detected set of facial keypoints.

8. The electronic device according to claim 1, wherein the circuitry is further configured to determine the face pose as the right profile pose based on both the third facial keypoint and the fourth facial keypoint are absent in the detected set of facial keypoints.

9. The electronic device according to claim 1, wherein
   the first variable value corresponds to a value of an x-coordinate of a corner of the face bounding box,
   the set of values further includes a value of a y-coordinate of a fifth facial keypoint that corresponds to one of the left eye of the object or the right eye of the object, and
   the fifth facial keypoint is included in the detected set of facial keypoints.

10. The electronic device according to claim 9, wherein the circuitry is further configured to:
    compute a value of a y-coordinate of the corner of the face bounding box based on the value of the y-coordinate of the fifth facial keypoint;
    compute the height of the face bounding box based on the value of the y-coordinate of the corner of the face bounding box, a height of the image, and the width of the face bounding box; and
    generate the face bounding box based on the value of the x-coordinate of the corner of the face bounding box, the value of the y-coordinate of the corner of the face bounding box, the height of the face bounding box, and the width of the face bounding box, wherein the set of values further includes the value of the y-coordinate of the corner of the face bounding box and the height of the face bounding box.

11. The electronic device according to claim 9, wherein the circuitry is further configured to control a display device to display a message that indicates that the face bounding box is undefined for the face of the object.

12. The electronic device according to claim 11, wherein the message is displayed based on the width of the face bounding box is less than a threshold width.

13. The electronic device according to claim 11, wherein the message is displayed based on the third facial keypoint and the first facial keypoint are absent in the set of facial keypoints.

14. A method, comprising:
    receiving an image that includes an object;
    detecting a set of facial keypoints on a face of the object in the image, wherein the set of facial keypoints corresponds to a set of facial features of the object, and the set of facial keypoints includes a first facial keypoint corresponding to a right eye, a second facial keypoint corresponding to a right ear, a third facial keypoint corresponding to a left eye, and a fourth facial keypoint corresponding to a left ear;

determining a specific value associated with each facial keypoint of the set of facial keypoints;

determining a face pose of the object as a left profile pose based on the specific value of each of the first facial keypoint corresponding to the right eye and the second facial keypoint corresponding to the right ear is null;

determining the face pose as a right profile pose based on the specific value of each of the third facial keypoint corresponding to the left eye and the fourth facial keypoint corresponding to the left ear is null;

computing a set of values that is associated with a size of a face bounding box in the image and a position of the face bounding box in the image, based on the determined face pose and a set of locations of the set of facial keypoints in the image, wherein the set of values includes a first set of variable values and a second set of variable values, the first set of variable values includes a pose variable value, a first variable value that corresponds to a first horizontal value of a first coordinate associated with at least one of the set of facial keypoints, a second variable value that corresponds to a second horizontal value of a second coordinate associated with the at least one of the set of facial keypoints, and a third variable value that corresponds to a vertical value of a third coordinate associated with the third facial keypoint, based on detection of the fourth facial keypoint of the detected set of facial keypoints, the first coordinate corresponds to a fourth coordinate of the third facial keypoint and the second coordinate corresponds to a fifth coordinate of the fourth facial keypoint, the second set of variable values includes a fourth variable value that corresponds to a width of the face bounding box and a fifth variable value that corresponds to a height of the face bounding box, each of the first variable value, the second variable value, the third variable value, the fourth variable value, and the fifth variable value is different, the first horizontal value is different from the second horizontal value, and each the first coordinate, the second coordinate, the third coordinate, the fourth coordinate, and the fifth coordinate is different; and overlaying the face bounding box on the image based on the computed set of values.

15. The method according to claim 14, wherein each facial keypoint of the set of facial keypoints indicates a location of the set of locations associated with at least one of the set of facial features in the image.

16. The method according to claim 14, wherein the set of facial features includes at least one of a nose, the left ear, the right ear, the left eye, or the right eye of the object.

17. The method according to claim 14, wherein the face pose of the object is one of a frontal pose, the right profile pose, or the left profile pose.

18. The method according to claim 14, wherein
the first variable value corresponds to a value of an x-coordinate of a corner of the face bounding box,
the set of values further includes a value of a y-coordinate of a fifth facial keypoint that corresponds to one of the left eye of the object or the right eye of the object, and
the fifth facial keypoint is included in the detected set of facial keypoints.

19. The method according to claim 18, further comprising:

computing a value of a y-coordinate of the corner of the face bounding box based on the value of the y-coordinate of the fifth facial keypoint;

computing the height of the face bounding box based on the value of the y-coordinate of the corner of the face bounding box, a height of the image, and the width of the face bounding box; and generating the face bounding box based on the value of the x-coordinate of the corner of the face bounding box, the value of the y-coordinate of the corner of the face bounding box, the height of the face bounding box, and the width of the face bounding box, wherein the set of values further includes the value of the y-coordinate of the corner of the face bounding box and the height of the face bounding box.

20. A non-transitory computer-readable medium having stored thereon, computer-executable instructions which, when executed by an electronic device, cause the electronic device to execute operations, the operations comprising:

receiving an image that includes an object;

detecting a set of facial keypoints on a face of the object in the image, wherein the set of facial keypoints corresponds to a set of facial features of the object, and the set of facial keypoints includes a first facial keypoint corresponding to a right eye, a second facial keypoint corresponding to a right ear, a third facial keypoint corresponding to a left eye, and a fourth facial keypoint corresponding to a left ear;

determining a specific value associated with each facial keypoint of the set of facial keypoints;

determining a face pose of the object as a left profile pose based on the specific value of each of the first facial keypoint corresponding to the right eye and the second facial keypoint corresponding to the right ear is null;

determining the face pose as a right profile pose based on the specific value of each of the third facial keypoint corresponding to the left eye and the fourth facial keypoint corresponding to the left ear is null;

computing a set of values that is associated with a size of a face bounding box in the image and a position of the face bounding box in the image, based on the determined face pose and a set of locations of the set of facial keypoints in the image, wherein the set of values includes a first set of variable values and a second set of variable values, the first set of variable values includes a pose variable value, a first variable value that corresponds to a first horizontal value of a first coordinate associated with at least one of the set of facial keypoints, a second variable value that corresponds to a second horizontal value of a second coordinate associated with the at least one of the set of facial keypoints, and a third variable value that corresponds to a vertical value of a third coordinate associated with the third facial keypoint, based on detection of the fourth facial keypoint of the detected set of facial keypoints, the first coordinate corresponds to a fourth coordinate of the third facial keypoint and the second coordinate corresponds to a fifth coordinate of the fourth facial keypoint, the second set of variable values includes a fourth variable value that corresponds to a width of the face bounding box and a fifth variable value that corresponds to a height of the face bounding box, each of the first variable value, the second variable value, the third variable value, the fourth variable value, and the fifth variable value is different, the first horizontal value and the second horizontal value are different, and each of the first coordinate, the second coordinate, the third coordinate, the fourth coordinate, and the fifth coordinate is different; and overlaying the face bounding box on the image based on the computed set of values.

* * * * *